United States Patent
Hamilton, II et al.

(10) Patent No.: US 10,115,113 B2
(45) Date of Patent: Oct. 30, 2018

(54) IMMERSIVE ADVERTISEMENTS IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Anne R. Sand, Peyton, CO (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2293 days.

(21) Appl. No.: 12/189,220

(22) Filed: Aug. 11, 2008

(65) Prior Publication Data

US 2010/0036729 A1    Feb. 11, 2010

(51) Int. Cl.
G06Q 30/02    (2012.01)

(52) U.S. Cl.
CPC ......... G06Q 30/02 (2013.01); G06Q 30/0251 (2013.01)

(58) Field of Classification Search
CPC ..................................................... G06Q 30/02
USPC ........................................................ 705/14
See application file for complete search history.

(56) References Cited

U.S. PATENT DOCUMENTS

| | | |
|---|---|---|
| 6,036,601 A | 3/2000 | Heckel |
| 6,070,149 A | 5/2000 | Tavor et al. |
| 6,118,456 A | 9/2000 | Cooper |
| 6,256,043 B1 | 7/2001 | Aho et al. |
| 6,329,986 B1 | 12/2001 | Cheng |
| 6,396,509 B1 | 5/2002 | Cheng |
| 6,738,065 B1 | 5/2004 | Even-Zohar |
| 6,801,930 B1 | 10/2004 | Dionne et al. |
| 6,845,486 B2 | 1/2005 | Yamada et al. |
| 6,928,414 B1 | 8/2005 | Kim |
| 6,954,728 B1 | 10/2005 | Kusumoto et al. |
| 6,968,315 B1 | 11/2005 | Nakisa |
| 6,981,220 B2 | 12/2005 | Matsuda |
| 7,054,831 B2 | 5/2006 | Koenig |
| 7,076,445 B1 | 7/2006 | Cartwright |
| 7,184,047 B1 | 2/2007 | Crampton |
| 7,210,104 B2 | 4/2007 | Nakagawa et al. |
| 2001/0020955 A1 | 9/2001 | Nakagawa et al. |
| 2002/0040327 A1 | 4/2002 | Owa |
| 2002/0138607 A1 | 9/2002 | O'Rourke et al. |
| 2003/0005439 A1 | 1/2003 | Rovira |
| 2003/0126035 A1* | 7/2003 | Kake et al. ............... 705/26 |
| 2004/0030741 A1 | 2/2004 | Wolton et al. |
| 2004/0064351 A1 | 4/2004 | Mikurak |
| 2004/0143495 A1 | 7/2004 | Koenig |
| 2004/0148221 A1 | 7/2004 | Chu |
| 2004/0162759 A1 | 8/2004 | Willis |
| 2004/0193441 A1 | 9/2004 | Altieri |

(Continued)

*Primary Examiner* — Daniel M Sorkowitz
(74) *Attorney, Agent, or Firm* — Brian Restauro; Andrew M. Calderon; Roberts Mlotkowski Safran Cole & Calderon, P.C.

(57) ABSTRACT

The invention generally relates to systems and methods for advertising, and, more particularly, to systems and methods for providing immersive advertising in a virtual universe. In one aspect of the invention, there is a method for presenting a virtual universe advertisement (VU-ad) in a virtual universe (VU), receiving input from a user associated with a user avatar of the VU, and altering the VU-ad in response to the input.

21 Claims, 5 Drawing Sheets

(56) References Cited

U.S. PATENT DOCUMENTS

| | | |
|---|---|---|
| 2005/0022139 A1* | 1/2005 | Gettman et al. ............. 715/850 |
| 2005/0030309 A1 | 2/2005 | Gettman et al. |
| 2005/0086605 A1 | 4/2005 | Ferrer et al. |
| 2005/0086612 A1 | 4/2005 | Gettman et al. |
| 2005/0179685 A1* | 8/2005 | Kake et al. .................. 345/419 |
| 2005/0216346 A1* | 9/2005 | Kusumoto et al. ............ 705/14 |
| 2006/0015904 A1 | 1/2006 | Marcus |
| 2006/0111979 A1 | 5/2006 | Chu |
| 2006/0143095 A1 | 6/2006 | Sandus et al. |
| 2006/0178968 A1 | 8/2006 | Jung et al. |
| 2006/0178975 A1 | 8/2006 | Jung et al. |
| 2006/0287105 A1 | 12/2006 | Willis |
| 2007/0061202 A1 | 3/2007 | Ellis et al. |
| 2007/0061204 A1 | 3/2007 | Ellis et al. |
| 2007/0101276 A1 | 5/2007 | Yuen |
| 2007/0118394 A1 | 5/2007 | Cahoon |
| 2007/0118420 A1 | 5/2007 | Jung et al. |
| 2007/0129148 A1 | 6/2007 | Van Luchene |
| 2007/0156509 A1 | 7/2007 | Jung et al. |
| 2008/0201321 A1* | 8/2008 | Fitzpatrick et al. ............. 707/5 |
| 2009/0089157 A1* | 4/2009 | Narayanan ............. A63F 13/12 705/14.23 |
| 2009/0094517 A1* | 4/2009 | Brody et al. .................. 715/706 |
| 2009/0132361 A1* | 5/2009 | Titus et al. ..................... 705/14 |
| 2009/0132382 A1* | 5/2009 | Mirza ............... G06Q 30/0601 705/26.1 |

\* cited by examiner

IMMERSIVE ADVERTISEMENTS IN A VIRTUAL UNIVERSE

FIELD OF THE INVENTION

The invention generally relates to systems and methods for advertising, and, more particularly, to systems and methods for providing immersive advertising in a virtual universe.

BACKGROUND

The concept of a virtual universe (also called a virtual world or a metaverse) is rapidly becoming a popular part of today's culture. In general, a virtual universe (VU) is a digital world (e.g., a three-dimensional computer-generated landscape) in which a user controls an avatar (e.g., a graphical representation of the user in the VU) to interact with objects and other avatars within the VU. Examples of popular VUs include SECOND LIFE® (a registered trademark of Linden Research, Inc. in the United States, other countries, or both) and ACTIVEWORLDS® (a registered trademark of Activeworlds, Inc. in the United States, other countries, or both).

Generally, a host computing system stores data regarding the landscape, objects, and users of the VU. A client software program runs on each user computer. The client program communicates (e.g., through a network connection) with the host system, and provides a visual (and, sometimes, audible) representation of the VU on the user computer. As the user moves his or her avatar throughout the VU, the visual representation displayed on the user computer changes according to the avatar location in the VU. In this manner, a user may cause his or her avatar to approach other avatars and interact with the other avatars. For example, one avatar may approach and communicate with another avatar via VOIP (voice over IP) and/or text-based communication through the network.

Moreover, in some VUs, users may possess virtual money that is purchased with real money. For example, a user may allow a VU host to debit his or her credit card in exchange for virtual money. The user can then exchange this virtual money with other users of the virtual world for a wide range of items and/or services, such as, for example, objects (e.g., clothing for an avatar), access to private areas of the VU, etc.

Additionally, in some VUs, users may even own virtual real estate. For example, a user may pay the VU host, or another third party, real money for an area of virtual real estate in the VU. The user may then create objects on that real estate, such as a night club where music plays and other avatars are invited to congregate to socialize (e.g., chat, dance, etc.).

With the possibility of owning virtual real estate and creating objects on that real estate that others users can see and hear, it is not surprising that entities have begun advertising inside VUs. However, although advertising is ubiquitous in real life today, advertising is only beginning to be realized and utilized in VUs. Current methods of advertising in VUs are generally passive. For example, billboards having logos, brand names, animated commercials, etc., are often created and displayed in various spaces of the VU. Like conventional television ads, such billboards provide a brief summary of a product or service. Similarly, some companies have created virtual showrooms in which likenesses of real-world products are displayed. However, such passive advertising is easily ignored and/or does not generate sufficient interest in many users, and thus often provides little value to the advertiser.

Online virtual universes or environments present a tremendous new outlet for both structured and unstructured virtual collaboration, gaming and exploration, as well as real-life simulations in virtual spaces. These activities, along with yet to be disclosed new dimensions, in turn, provide a wide open arena for creative and new advertising methods and mechanisms. Immersive virtual universes, among other things, are an avenue to expose potential consumers to a company's advertising. With the astounding and continual increase in the number of users of virtual worlds, companies are taking more interest in reaching out to virtual world residents through advertising.

SUMMARY

In a first aspect of the invention, there is a computer implemented method comprising: presenting a virtual universe advertisement (VU-ad) in a virtual universe (VU), receiving input from a user associated with a user avatar of the VU, and altering the VU-ad in response to the input.

In another aspect of the invention, there is a computer implemented method for providing advertising in a virtual universe. The method comprises providing a program that defines a virtual universe advertisement (VU-ad). The method also includes displaying the VU-ad at a location in a virtual universe (VU), obtaining profile data associated with a user avatar, and altering the VU-ad based upon the obtained profile data.

In another aspect of the invention, a computer program product comprises a computer usable medium having a computer readable program embodied in the medium, wherein the computer readable program when executed on a computing device causes the computing device to stage a virtual universe advertisement (VU-ad) at a location in a virtual universe (VU). The computing device is further caused to alter the VU-ad based upon at least one of profile data associated with a user avatar, and interaction of the user avatar with the VU-ad.

In another aspect of the invention, there is a method for advertising in a virtual universe comprising providing a computer infrastructure structured and arranged to present a virtual universe advertisement (VU-ad) in a virtual universe (VU), permit a user of the VU to interact with the VU-ad during the presenting, and alter at least one characteristic of the VU-ad based upon the interaction.

In another aspect of the invention, there is a system comprising computer hardware and software that is structured and arranged to: present a virtual universe advertisement (VU-ad) in a virtual universe (VU); receive input from a user associated with a user avatar of the VU; and alter the VU-ad in response to the input.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to systems and methods for advertising, and, more particularly, to systems and methods for providing immersive advertising in a virtual universe. Exemplary embodiments of the invention allow potential customers (e.g., users controlling avatars in a VU) to engage in an immersive advertising experience in a VU. For example, users may cause their avatar to step into an advertisement and interact with advertising avatars and/or other VU objects to obtain more information about the product and/or service offered. In this manner, the user is provided with a memorable interactive experience, which may lead to an increased likelihood of success for the advertisement.

With the growing popularity of collaborative (e.g., Web 2.0) services (e.g., blogs, wikis, etc.), there is a realization that consumers are no longer satisfied with passive entertainment and/or advertising in which information is merely thrust upon them. Instead, it is perceived that VUs, simulation games, and/or television may merge to form a hybrid interactive entertainment experience and commerce medium. In accordance with this, implementations of the invention provide a three dimensional, immersive, and interactive experience for advertising a product and/or service. As such, embodiments of the invention provide consumers with a more interactive and enjoyable experience, while also providing sellers enhanced advertising techniques beyond traditional television and other passive media.

Figure 1:
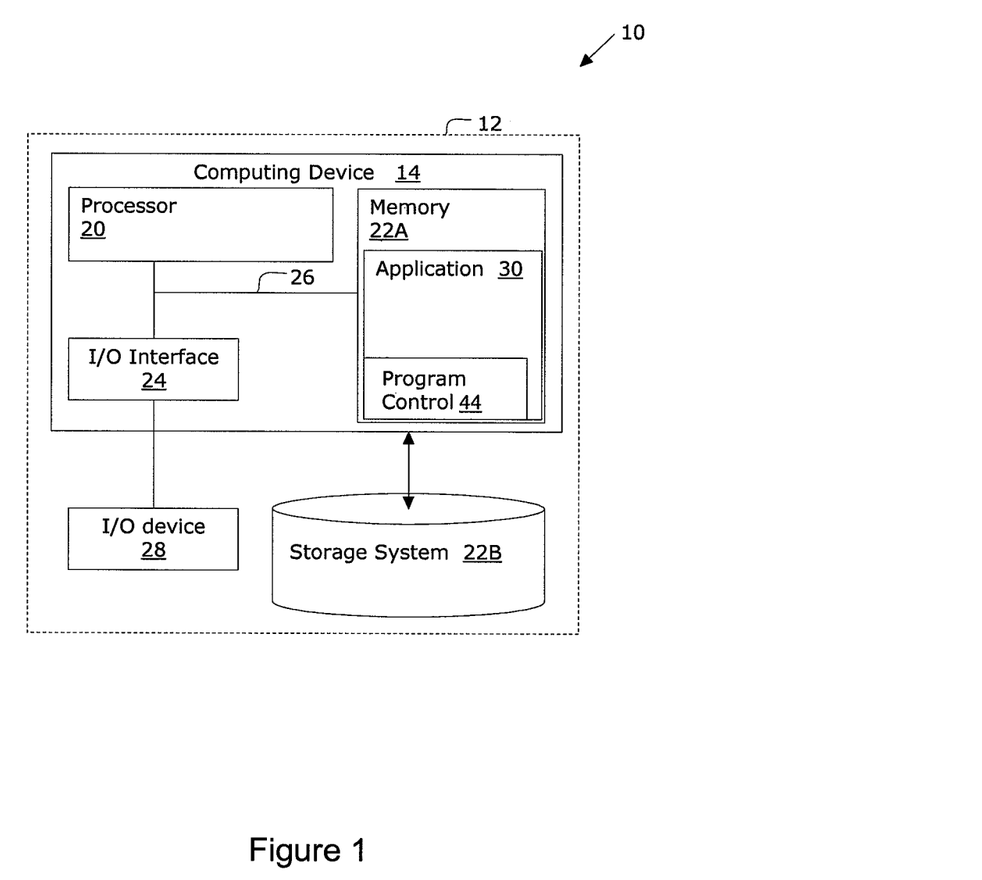
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, provide immersive advertising in a VU. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, provide immersive advertising. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
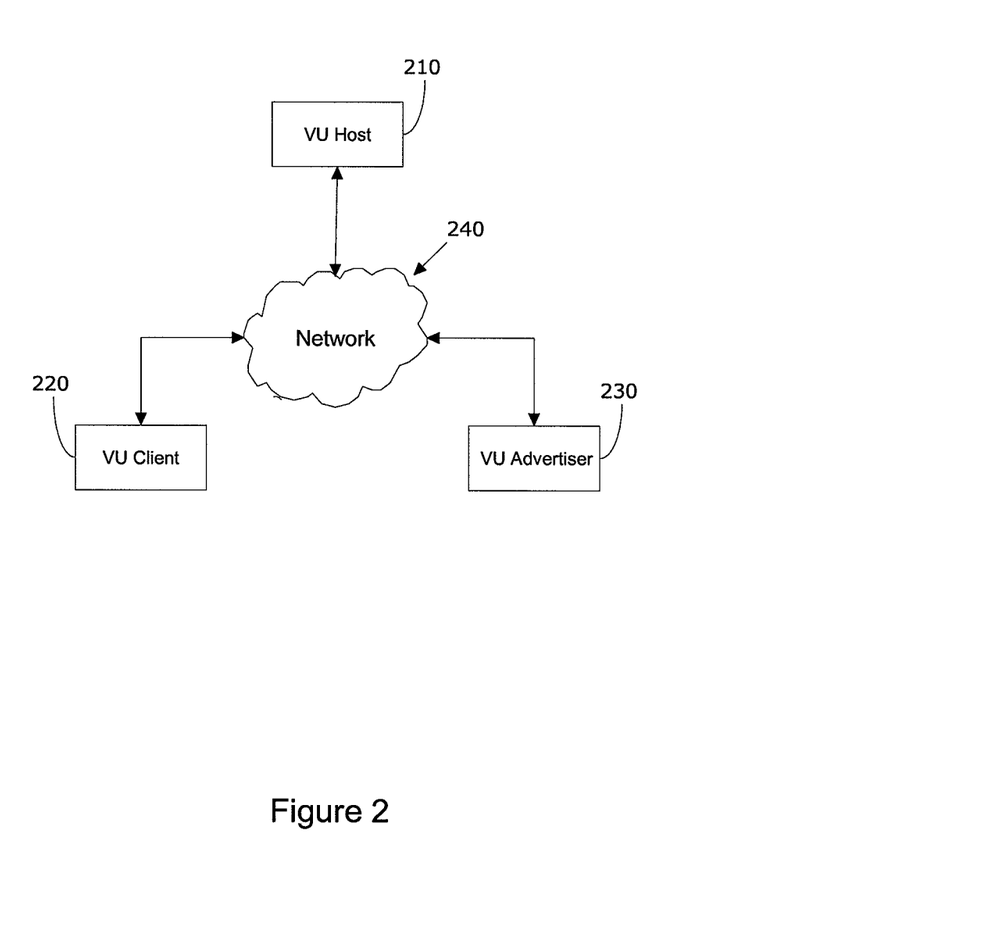
FIG. 2 shows an exemplary system according to aspects of the invention.

FIG. 2 shows an exemplary system according to aspects of the invention. In embodiments, a host 210 is operatively connected to at least one client 220 and at least one advertiser 230 via a network 240. The host 210 may comprise at least one computing device, such as that described with respect to FIG. 1, which operates the engine of a VU. For example, the host 210 may comprise a plurality of servers and/or databases that store data and provide the simulation engine(s) of a VU. Moreover, the network 240 may comprise any suitable communication network, such as, for example, the Internet.

In embodiments, the client 220 comprises a computing device, such as, for example, a general purpose computing device comprising at least a processor, memory, I/O interface, and I/O device. Such computing devices are known in the art, such that further explanation is not believed necessary. In embodiments, the client 220 operates a client program of the VU. The client 220 allows a human user to create a persona for use in the VU. For example, the persona may take the form of an avatar that is moveable throughout portions of the VU. Additionally, a profile of attributes of the user may be associated with the avatar. The profile may contain user-entered data regarding any suitable attributes of the user, such as, for example: age, gender, address, country of citizenship, occupation, hobbies, interests, etc. The profile data may be stored at the client 220 or at the host 210 (e.g., in a database, not shown). Moreover, there may be any suitable number of clients 220 interacting with the host 210. The host and client VU system described hereinabove up to now is known in the art such that further explanation is not believed necessary.

Still referring to FIG. 2, in embodiments the advertiser 230 comprises a computing device, such as that described with respect to FIG. 1. Like the client 220, the advertiser 230 runs a client program of the VU. In embodiments, the advertiser 230 provides at least one immersive advertisement in the VU (referred to herein as a VU-ad). For example, the advertiser 230 may be used to create a script (e.g., program) that defines a VU-ad, and the program may be uploaded to the host 210. The VU-ad, whether run from the advertiser 230 or the host 210, may be controlled by a stored script (e.g., program), a human user, or a combination of both. The VU-ad may comprise any desired content that is perceptible by other users of the VU (via clients 220), and with which at least one user of the VU may interact with and/or become immersed in. When the VU-ad is at least partially controlled by a script, portions of the script may be stored at the advertiser 230 and/or at the host 210 (e.g., in a database, not shown).

To facilitate understanding of the concept of the VU-ad, an example of such a VU-ad is explained at a generalized level, after which features of the VU-ad are described in greater detail below. The example is provided merely for description purposes, and does not define or limit the scope of the invention. In the example, an advertiser and/or host stores and executes a program that defines a VU-ad that is visible to other users of the VU. For example, the VU-ad may comprise several actors (e.g., ad avatars) talking and moving around an ad object (e.g., a virtual car) at a location in the VU grid.

Still referring to the example, the VU-ad is defined (e.g., via programming) in a manner that allows a user to cause their user avatar to interact with components of the VU-ad. Such interaction may include, for example, chatting with the ad avatars, opening the hood of the car, removing car parts to place in the user avatar inventory for later inspection, pushing an ad avatar out of the way to see the car better, deleting an ad avatar, changing the visual appearance of an ad avatar, and so forth. The VU-ad may be defined such that plural user avatars can interact with the same in-progress VU-ad (and, possibly, other user avatars) at the same time, creating a fun, customized, and compelling experience.

More specifically, in embodiments the VU-ad comprises at least one ad object at a location in the VU. Some features of the ad object may be unalterable, while other features may be altered by the avatar of a user interacting with the ad object. For example, the VU-ad may comprise a rendering of an automobile object in the VU that is approachable by avatars in the VU. The VU-ad may be arranged (e.g., by the programming that defines the VU-ad) such that a user, via control of his or her avatar, may change certain features of the automobile object. For example, the user may change the color of the automobile object, lift the hood and move parts of the ad object, delete parts from view, etc. The definition of which features of the ad object are changeable, how they may be changed, and which features are not changeable may comprise tags that are in the form of metadata and/or stored in policy tables. Changeable features of the ad object may be changed by the user via the client 220 and suitable input/output commands, such as, for example, mouse clicks, menu selections, keystrokes, text communications, voice communications, etc, any of which can be implemented by aspects of the invention.

In further embodiments, the VU-ad comprises at least one ad avatar which interacts with at least one user avatar. The ad avatar may comprise an avatar bot (e.g., run by a script), or may be controlled by a human operator in real time, or some combination of both. Like the ad object, an ad avatar may be defined at least partially by metadata enabling some features of the ad avatar to be altered by a user (e.g., via control of the user avatar). For example, a user that is fluent in Japanese may alter an ad avatar that originally communicates in the English language to communicate in Japanese. Additionally or alternatively, a user may cause the ad avatar to have a visual appearance similar to the user avatar, such as, for example, in terms of gender, ethnicity, etc. Even further, the user may cause an ad avatar to move to a different location (e.g., step aside so the user can get a better view of an object), and/or delete the ad avatar from view altogether. As with the ad objects, changeable features of the ad avatar may be changed by the user via the client 220 and suitable input/output commands, such as, for example, mouse clicks, menu selections, keystrokes, text communications, voice communications, etc.

In even further embodiments, a user profile is accessed by the VU-ad (e.g., by the advertiser or host), and aspects of the VU-ad are automatically altered based upon the profile data. For example, when a user avatar approaches an ad object and/or ad avatar, the user's profile data may be accessed by the VU-ad. If the user profile contains, for example, an age of thirteen years old, a script or human operator may cause an ad-avatar to communicate in a lingo (i.e., vernacular) that the advertiser feels is more appropriate for this age group. Although age is described here, the invention is not limited to this profile aspect, and the VU-ad may be altered in any suitable fashion based upon any suitable combination of profile aspects, including, but not limited to: age, gender, ethnicity, occupation, income, hobbies, address, history of interacting with ads, etc.

In still further embodiments, the VU-ad is dynamically changed during the VU-ad based upon customer behavior during the VU-ad. For example, if a user avatar is interacting with an ad object such as an automobile object, and the user avatar is looking at and/or touching engine parts of the automobile object, then a script or human operator of the VU-ad may cause a specification sheet of the engine performance to be displayed to the user. Additionally or alternatively, if the user avatar is interacting with the interior of the automobile object, then the VU-ad may cause interior options to be displayed to the user.

Also, in yet further embodiments, data regarding customer behavior during VU-ads is stored in a database for use in later VU-ads. For example, when a user alters an ad avatar and/or an ad object during a first interaction with a VU-ad, these changes are saved and automatically presented to the user should the user interact with the same (or an associated) VU-ad at a later date. Additionally or alternatively, such customer interactions with VU-ads may be tracked to provide marketing data that can be used with this customer again or provided to other entities.

In additional embodiments, the VU-ad operates to present free trials, free products, coupons, and/or other incentives to users who interact with the VU-ad. For example, when a user avatar interacts with an ad avatar and/or ad object, a script or human operator of the VU-ad may award an incentive to the user. The incentive may be awarded in any suitable fashion, such as, for example, by displaying and/or emailing an alpha-numeric promotional code to the user, or by emailing a voucher, coupon, certificate, etc., to the user.

Moreover, in embodiments, the VU-ad comprises at least one human operator that interrupts automated ad avatar bots and/or prerecorded commercials. For example, when a user is interacting with an automated (e.g., script-driven) VU-ad and the user activates a trigger, a human operator associated with the VU-ad communicates with the user. The trigger can be any desired set of circumstances, such as, for example: the user selects a menu option for a human operator, the user performs a pre-defined interaction with the ad avatar and/or ad object, the user spends a threshold amount of time interacting with the ad avatar and/or ad object, etc.

In even further embodiments, the VU-ad allows a user to interact with the ad by stepping into the ad. For example, the VU-ad may comprise a group of ad avatars and ad objects that represent a scene (e.g., of a movie) that is played for a user to view (via the user avatar). In implementations of the invention, the user may opt to step into a three-dimensional representation of the scene to view the actors (e.g., ad avatars) from different points of view. Additionally or alternatively, the user avatar may assume the role of one of the actors, such that the user avatar moves and/or speaks a portion of the movie scene as if the user avatar were actually the actor in the scene.

In implementations where a user can step into the VU-ad, embodiments allow users to indicate whether they want to enter the VU-ad alone or with other users. For example, two user avatars may hold hands and step into a VU-ad, thereby indicating that both users wish to enter the VU-ad together. Alternatively, an individual user entering alone would be allocated his or her own private VU-ad. In this manner, multiple users can interact with a VU-ad as a group, while at the same time individual users may be provided with a private VU-ad.

Location of a VU-Ad in the VU

According to aspects of the invention, a VU-ad may occur at different locations within the VU. For example, a VU-ad including at least one ad avatar and/or at least one ad object may be displayed at a static location in the VU. The static location may be a grid location in the VU, such as a piece of real estate owned by the advertiser or another party. The VU-ad may be repeated in the static grid location any suitable number of times. In this example, users bring their avatar into proximity with the VU-ad to observe and interact with the VU-ad.

In another example, the VU-ad travels to different locations throughout the VU. That is, a VU-ad is displayed at a first grid location at a first time, and subsequently displayed at a second, different grid location at a later time. The number of grid locations is not limited, and the VU-ad can occur at any suitable number of different grid locations. This implementation is similar to the first example, in that the user observes and interacts with the ad by being in proximity to the grid location where the VU-ad is presently occurring. Additionally or alternatively, the ad avatars and/or ad objects may be visually displayed in the VU as traveling between the different locations of the VU-ad. In this manner, a user may see the VU-ad in transit, and follow the VU-ad to its next location to observe the VU-ad.

In a third example, the VU-ad may be displayed as a machinima of a commercial projected on a screen (e.g., a billboard, television screen, etc.) at a location in the VU. For example, ad avatars and/or objects may be located at a first location in the VU, and the machinima is displayed in real time at a second, different location in the VU. A user observing the machinima may move (e.g., walk or fly) into the machinima and be teleported to the first location. The use of machinima is known, such that further explanation is not believed necessary. For example, machinima may comprise a video rendered using real-time, interactive 3-D engines, such as those used in first-person-shooter games. As another example, machinima may comprise a video generated and/or shown in a virtual space where characters and events are controlled by at least one of: scripts, artificial intelligence, and humans. Also, the use of teleporting a user avatar from a first location to a second location is known, such that further explanation is not believed necessary.

In another example, the VU-ad may be displayed in an ephemeral location in the VU. The ephemeral location is a temporary location in the VU that is rendered solely for the purpose of the VU-ad, and is un-rendered after completion of the VU-ad. For example, a user may initiate the VU-ad by some trigger (e.g., menu option, touching a predefined object, moving over a pre-defined VU grid location). Once triggered, the user avatar is teleported to the newly rendered ephemeral location where the VU-ad occurs. The user observes and/or interacts with the VU-ad at the ephemeral location. Upon completion of the VU-ad, the user avatar is teleported back to the original VU grid location (or, alternatively, to another VU grid location), and the ephemeral location is un-rendered. In this manner, the VU-ad does not occupy permanent real estate in the VU.

In another implementation, the VU-ad may occur at the user avatar current location in the VU. For example, the user may initiate the VU-ad by clicking on an object, stating a phrase, selecting from a menu, etc. In this manner, the user is provided with the VU-ad in any location that the user desires. Put another way, in this exemplary implementation, the VU-ad comes to the user, instead of the user coming to the VU-ad.

In an even further implementation, the VU-ad may occur in an impromptu manner anywhere in the VU. For example, pre-defined VU grid locations may be set to trigger the VU-ad when a user avatar moves over the grid location. Additionally or alternatively, the VU-ad may be triggered upon detection that user avatars are discussing a topic related to the advertised product. This can be accomplished, for example, by listening for pre-defined keywords, and triggering the VU-ad upon hearing the keywords.

Valuation of a VU-Ad

According to aspects of the invention, an owner of a VU-ad compensates a user who owns VU real estate when the VU-ad occurs on the user's real estate. The compensation may take any suitable form, such as, for example, payment in virtual currency (e.g., transfer of balance from one account to another), payment in real-life currency, special offers on goods and/or services, etc. The amount of compensation may be determined based upon any suitable factors, such as the ones described herein.

In embodiments, the real estate owner is paid a fee for each time the VU-ad occurs on the real estate. The fee can be pre-negotiated, and automatically paid each time the VU-ad occurs on the real estate. The fee may be based upon, for example, the proximity of the real estate to popular areas (e.g., high traffic areas) of the VU. Similarly, in the above-described example of ad avatars and ad objects traveling through the VU and presenting the VU-ad at various locations, the VU-ad provider may pay compensation to any real estate owner which the VU-ad travels across.

Another factor that may be taken into account in determining the compensation is the number of user avatars that are within sight and/or hearing distance of the VU-ad. For example, a VU-ad provider may be willing to pay more compensation to a VU real estate owner if the VU-ad is seen/heard by more users. Yet another factor that may be taken into account is the profile data of the users that observe and/or interact with the VU-ad. For example, a higher compensation may be justified if a user who interacts with the VU-ad has a profile that matches the target market/demographic for the VU-ad. Data regarding the proximity of avatars to a VU-ad and user profile data is determinable from the VU host.

Still another factor that may be taken into account in determining the compensation is the characteristic of the user interaction with the VU-ad. For example, the length of user interaction with the VU-ad, the value or number of incentives distributed to users by the VU-ad, the amount of purchases that result from the VU-ad, the number of clicks of users going to the advertiser's external web page through the VU-ad, the number of telephone calls and/or emails resulting from the interaction with the VU-ad, etc., all are indicative of the value gained by the advertiser. As such, these factors can be used to determine the amount of compensation a VU-ad owner will pay a VU real estate owner for displaying the VU-ad.

Processes of the Invention

The steps of the flow diagrams described herein may be implemented in the environment of FIGS. 1 and/or 2. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 3:
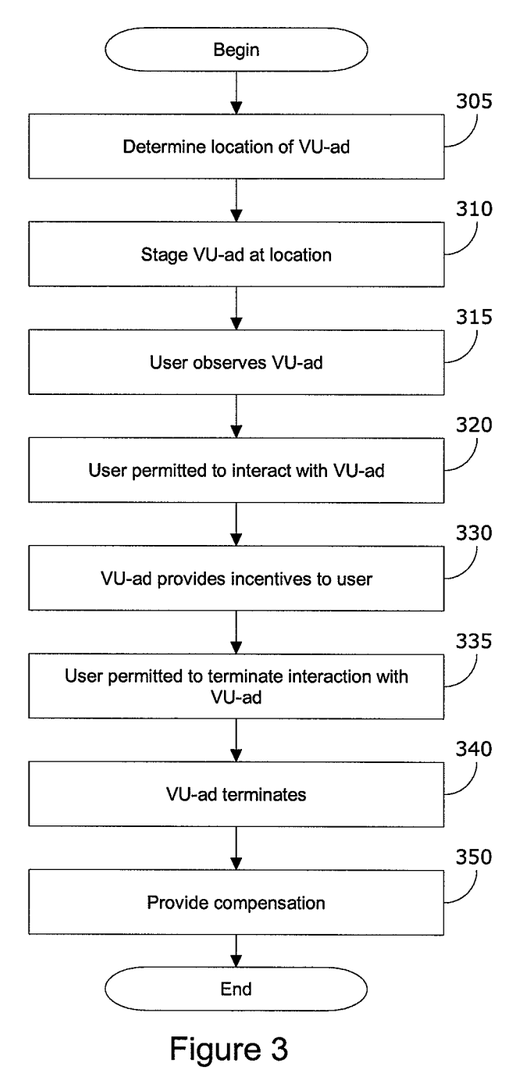
FIGS. 3-5 show a flow diagrams depicting implementations of a method according to aspects of the invention.

FIG. 3 shows a flow diagram depicting steps of a first embodiment for implementing VU-ads. At step 305, the location of the VU-ad is determined. In embodiments, this may be accomplished as already described herein with respect to the Location of a VU-ad in the VU. For example, the location may be, but is not limited to: a static pre-defined location in the VU, multiple locations in the VU, machinima based, an ephemeral location, a user initiated location, etc. In embodiments, the location may be determined by a user operator of the advertiser, or by a program stored at the advertiser or host.

At step 310, the VU-ad is staged at the location determined in step 305. In embodiments, the staging of the VU-ad is accomplished via execution of a VU-ad program that resides on the host and/or the advertiser computing device. For example, at least one ad avatar and/or at least one ad object is displayed at a location in the VU, and/or a machinima is displayed, and/or an emphemeral location is rendered, etc. At step 315, at least one user observes the staged VU-ad via the proximity of the user avatar to the VU-ad.

At step 320, a VU-ad system permits a user to interact with the ad via the user avatar. For example, the VU-engine, a program that defines the VU-ad, and the client program may cooperate to permit a user to move his/her avatar in or around ad avatars, ad objects etc. Step 320 may also comprise the user being permitted to communicate with aspects of the VU-ad (e.g., reading text of the VU-ad, listening to pre-recorded messages of the VU-ad, chatting with ad avatar bots, chatting with human operators of the ad, etc.).

Step 320 optionally includes the user being permitted to alter features of the VU-ad that have been tagged for alteration. For example, as described already, the user may move an ad avatar and/or ad object out of the way, delete an ad avatar and/or ad object, change the visual appearance of an ad avatar and/or ad object, assume the identity of an actor avatar in a scene, etc. The interaction (moving in and around, communicating, etc.) may continue after features of the VU-ad are altered.

Optionally at step 330, the user may receive incentives from the VU-ad. In embodiments, the incentives are provided by the VU-ad on behalf of an advertising entity. For example, the VU-ad may provide the user with a promotional code, voucher, coupon, gift certificate, virtual currency, etc. The incentives may be provided to the user in any suitable manner (e.g., displayed to the user, emailed to the user, mailed to the user, etc.). These incentives may be redeemable, for example, in the VU, at other Internet sites, at real world (e.g., brick and mortar) retailers, etc.

At step 335, the user terminates interaction with the VU-ad. In embodiments, this may be accomplished by the user performing any one of the following: moving the user avatar away from the location where the VU-ad is being displayed, choosing a menu option to terminate the VU-ad, clicking a terminating object on screen, typing a termination keystroke, moving the user avatar out of the ephemeral location, etc.

At step 340, the VU-ad terminates. This may comprise ad avatars and/or ad objects being removed from view in the VU, ad avatars and/or ad objects remaining in view but not moving until another user comes into proximity, ad avatars and/or ad objects traveling to another location in the VU, or an ephemeral location and all included ad avatars and/or ad objects being un-rendered, etc.

Optionally, at step 350, the advertiser (or any other suitable entity) pays compensation to the real estate owner (or other third party) where the VU-ad was staged. The type and value of the compensation, as well as the method of providing the compensation, may be determined in any suitable manner, such as that already described herein. For example, the VU-ad program may send an email with a promotional code to the VU real estate owner where the VU-ad was staged. As another example, upon completion of the VU-ad, a software agent may cause an electronic funds transfer from a predefined account of the advertiser to a predefined account of the real estate owner.

EXAMPLE 1

Figure 4:
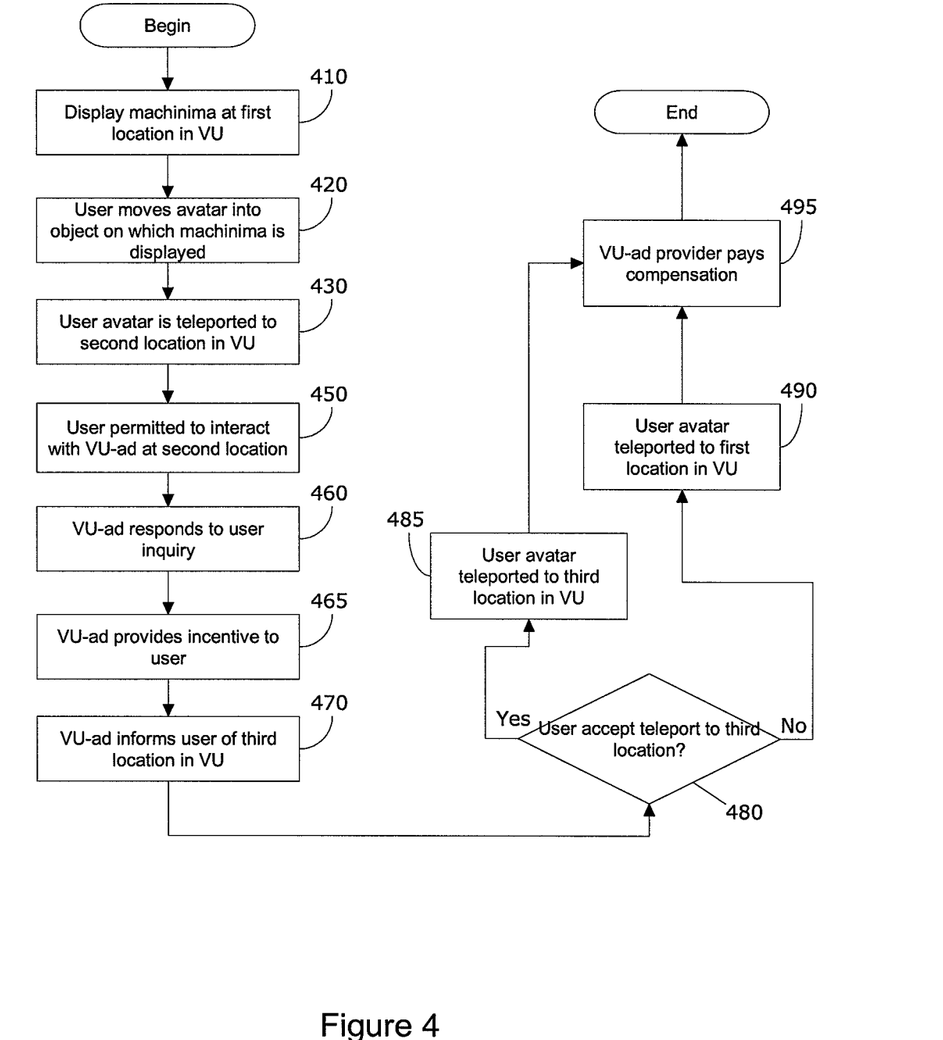

FIG. 4 shows a flow diagram depicting steps of an exemplary embodiment for implementing VU-ads. The method described with respect to FIG. 4 is a non-limiting exemplary implementation of various features already described herein. At step 410, a machinima is displayed at a first location in the VU. The machinima may be displayed on an object in the VU (e.g., television screen, billboard, etc.) as is known, such that further explanation is not believed necessary. The machinima may be played by a VU-ad provider, and may depict events happening in real time (or that have already happened) at another location in the VU. For example, the machinima may be a video of events happening at a VU simulation of a real world amusement park.

At step 420, a user observes the machinima and is permitted to move his/her avatar into the machinima. In embodiments, this functionality is provided by any suitable combination of the VU-engine, a program that defines the VU-ad, and the client program. For example, a user whose avatar is in the vicinity of the machinima may be intrigued by what is displayed in the machinima. This user then controls his/her avatar to move (e.g., walk, fly, etc.) into contact with the object displaying the machinima.

At step 430, after moving into the machinima, the user avatar is teleported to a second location of the VU. The second location may be any location, such as, for example, the location in the VU where the events of the machinima are actually occurring, another pre-defined location of the VU where ad avatars and/or ad objects await the arrival of the user, an ephemeral location, etc.

At step 450, the user is permitted to interact with the VU-ad at the second location. The interaction may be any suitable interaction, such as those already described herein. For example, the VU-ad may include an ad avatar in the form of a mascot of the amusement park, and the user may ask the mascot if the user is tall enough to ride the newest roller coaster at the real world amusement park. In embodiments, the parameters of the interaction are defined in the programming of the VU-ad, which, as already described herein, may be stored at the host or the advertiser computing device, or some combination of both.

At step 460, the VU-ad interacts with the user. For example, if the user asked a pre-defined question from a dropdown menu at step 450, then the mascot may automatically respond with a pre-defined message to the user. Additionally or alternatively, a human operator of the VU-ad may intervene (e.g., assume control of the ad avatar) and begin communicating with the user (e.g., via text message, VOIP, etc.). For example, the human operator may access the user profile or ask the user how tall he/she is, and then answer the user's question regarding the minimum height to ride the roller coaster.

Additionally or alternatively at step 465, the VU-ad may continue interacting with the user by providing an incentive to the user. For example, because the user has shown interest in the real world amusement park, the VU-ad may automatically (or by human operator intervention) offer the user an incentive regarding the real world amusement park (e.g., a coupon for reduced admission, a coupon for a free ice-cream inside the park, etc.).

Additionally or alternatively at step 470, the VU-ad may continue interacting with the user by informing the user of a location in the VU of a simulation of the real world roller coaster. For example, the mascot ad avatar may communicate the existence of the simulation to the user and offer to teleport the user to that location of the VU.

At step 480, the user decides whether to accept teleportation to the simulated roller coaster. If the user accepts, then at step at step 485, the user is teleported (e.g., by the programming of the VU-ad and/or the VU engine) to the location in the VU where the simulation of the real world roller coaster exists. If the user declines, then at step 490, the user is teleported back to the user's original location (i.e., where the machinima was observed in step 420).

Optionally, at step 495, the VU-ad provider pays compensation to, for example, a VU real estate owner where the machinima was observed in step 420. As already described herein, the compensation may comprise, for example, any appropriate combination of VU money, real world money, promotional discounts for the real estate owner, etc.

EXAMPLE 2

Figure 5:
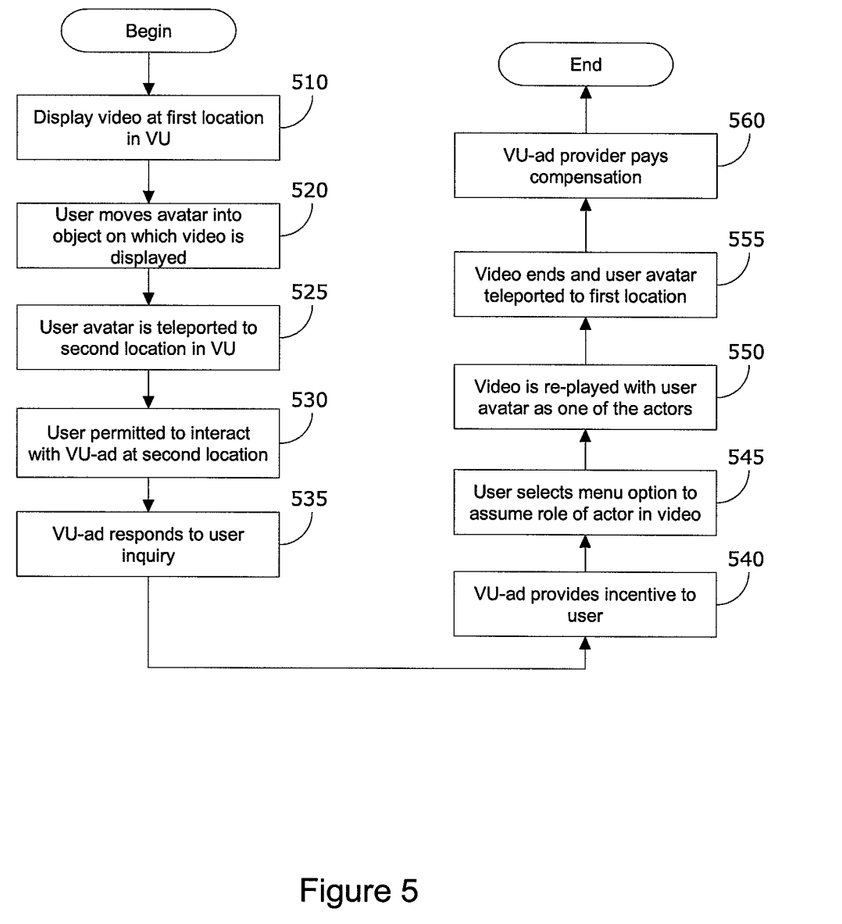

FIG. 5 shows a flow diagram depicting steps of another exemplary embodiment for implementing VU-ads. The method described with respect to FIG. 5 is a non-limiting exemplary implementation of various features already described herein. At step 510, a video is played at a first location in the VU by the VU-ad provider. The video may be, for example, a trailer of an upcoming movie that the VU-ad provided is promoting.

At step 520, a user who observes the video is permitted to move (e.g., walk, fly, etc.) his/her avatar into contact with the object on which the video is playing. At step 525, the user avatar is teleported to a second location of the VU. The second location may be any location, such as, for example, a pre-defined location of the VU where ad avatars and/or ad objects are acting out the scene in the video.

At step 530, the user is permitted to interact with the VU-ad. For example, the user may ask an ad avatar the rating of a movie. At step 535, the VU-ad continues the interaction by, for example, responding to the user inquiry about the movie rating. The response may be accomplished using a scripted response, or by a human operator of the VU intervening and providing the response to the user.

Additionally or alternatively at step 540, the VU-ad may continue interacting with the user by providing an incentive to the user. For example, because the user has shown interest in the movie, the VU-ad may automatically (or by human operator intervention) offer the user an incentive regarding the movie (e.g., a coupon for reduced admission, a promotional code to view limited-access videos at the movie's official website, etc.).

Additionally or alternatively at step 545, the user may continue interacting with the VU-ad by, for example, selecting a menu option to assume the role of one of the actors in the movie trailer. According to this aspect, the user's avatar changes appearance to be that of the chosen actor. At step 550, the movie trailer is replayed with the user's avatar playing the role of the chosen actor while the other ad avatars and ad objects perform according to the movie script.

At step 555, the interactive VU-ad ends, and the user is teleported back to the user avatar's original location (i.e., where the video was observed in step 520). Optionally, at step 560, the VU-ad provider pays compensation. This compensation may be paid, for example, to a VU real estate owner where the video was observed in step 520. As already described herein, the compensation may comprise, for example, any appropriate combination of VU money, real world money, promotional discounts for the real estate owner, etc.

Moreover, at least some of the steps of FIGS. 3-5 may be performed on a computer infrastructure that is at least one of created, maintained, deployed, and supported by a service provider. In return for providing such a computer infrastructure, the service provider may receive payment from at least one of a VU user, VU advertising entity, and VU host.

While the invention has been described in terms of embodiments, those skilled in the art will recognize that the invention can be practiced with modifications and in the spirit and scope of the appended claims.

What is claimed:

1. A computer implemented method for dynamically altering a virtual universe (VU), comprising:
   presenting, by a computing device, a virtual universe advertisement (VU-ad) at a first location in the VU, wherein the VU-ad comprises an ad object and an ad avatar that are separate from a user avatar associated with a user of the VU, and wherein the VU of the computing device is accessible by the user via a network;
   receiving, by the computing device, input from the user of the VU via the network;
   dynamically altering, by the computing device, the VU-ad in response to the input from the user;
   based on the user avatar contacting the ad object:
   rendering, by the computing device, an ephemeral location that does not occupy permanent real estate in the VU, which ephemeral location is a temporary location in the VU;
   teleporting, by the computing device, the user avatar from the first location to the ephemeral location;
   displaying, by the computing device a video or machinima in real time at the ephemeral location for the user avatar to observe and/or interact with;
   teleporting, by the computing device, the user avatar out of the ephemeral location back to the first location, or to another location in the VU, after the video or machinima is completed; and
   un-rendering, by the computing device, the ephemeral location after the user avatar has been transported out of the ephemeral location so that the VU-ad does not occupy permanent real estate in the VU,
   wherein the contacting the object comprises one of the user avatar touching, walking into, and flying into the object.

2. The method of claim 1, wherein the input comprises at least one of:
   a mouse command by the user;
   a menu selection by the user;
   a keystroke by the user;
   a text communication by the user; and
   a voice communication by the user.

3. The method of claim 1, wherein the altering the VU-ad comprises at least one of:
   moving the ad object or the ad avatar to a different location in the VU;
   altering a visual appearance of the ad object or the ad avatar;
   altering a written or spoken language of the VU-ad;
   deleting the ad object or the ad avatar;
   allowing the user avatar to assume a role of an actor in the VU-ad; and
   allowing the user avatar to step into a three-dimensional representation of a scene and view the ad object and/or the ad avatar from different points of view.

4. The method of claim 1, further comprising:
   providing an incentive to the user, wherein the providing an incentive comprises at least one of:
   transferring virtual money to an account of the user;
   providing a promotional code to the user;
   emailing a coupon to the user; and
   mailing a coupon to the user.

5. The method of claim 1, wherein the computing device is a host server in communication with an advertiser computing device via the network, and wherein at least one of the presenting, the receiving, and the altering is provided by a service provider under a subscription and/or fee agreement and/or based on advertising content to a user of the advertiser computing device, the method further comprising:
   receiving, by the computing device, script defining the VU-ad from the advertiser computing device; and
   storing, by the computing device, the script.

6. The method of claim 1, wherein the computing device is a host server in communication with a plurality of client computing devices through the network and providing the plurality of client computing devices with access to the VU, and wherein a service provider at least one of creates, maintains, deploys and supports.

7. The method of claim 1, further comprising compensating an entity associated with a location in the VU where the VU-ad is displayed.

8. A computer implemented method for dynamically altering advertising in a virtual universe, comprising:
   providing, by a computing device, a program that defines a virtual universe advertisement (VU-ad), wherein the VU-ad comprises at least one of an ad avatar and an ad object;
   displaying, by a computing device, the VU-ad at a first location in a virtual universe (VU) at a first time and at a second location in the VU at a second time, wherein the second location comprises an ephemeral location, that is rendered after a user avatar contacts the ad object in the first location and that does not occupy permanent real estate in the VU, and wherein the displaying of the VU-ad at the second location comprises displaying a video or machinima in real time at the second location for the user avatar to observe and/or interact with, wherein the ephemeral location is a temporary location in the VU rendered solely for the purpose of displaying the VU-ad;
   displaying, by a computing device, the at least one of the ad avatar and the ad object as traveling in the VU between the first location and the second location;
   obtaining, by a computing device, profile data associated with the user avatar, wherein the user avatar is separate from the at least one of the ad avatar and the ad object;
   altering, by a computing device, the VU-ad based upon the obtained profile data;
   teleporting, by a computing device, the user avatar from the second location back to the first location, or another location in the VU, after the video or machinima is completed;
   un-rendering, by a computing device, the ephemeral location after the user avatar has been transported out of the second location after the video or machinima is completed;

compensating, by a computing device, at least one VU real-estate owner associated with the first location; and compensating, by a computing device, an entity owning real estate upon which the traveling occurs.

9. The method of claim 8, wherein the profile data is stored at:
a client computing device of a user associated with the user avatar;
a host computing device of the VU; or
a database accessible by a host computing device of the VU.

10. The method of claim 8, wherein the altering the VU-ad comprises at least one of:
changing a visual appearance of an ad object or ad avatar;
changing a spoken or written language of the ad avatar; and
providing an incentive to a user associated with the user avatar.

11. A computer program product for dynamically altering a virtual universe (VU) comprising a computer usable hardware storage device having a computer readable program stored in the hardware storage device, wherein the computer readable program when executed on a computing device is operable to cause the computing device to:
stage a virtual universe advertisement (VU-ad) at a first location in the VU, wherein the VU-ad comprises an ad avatar and an ad object that are separate from a user avatar; and
alter the VU-ad based upon:
profile data associated with the user avatar, and
interaction of the user avatar with the VU-ad;
based on the user avatar contacting the ad object:
render an ephemeral location that does not occupy permanent real estate in the VU, which ephemeral location is a temporary location in the VU;
teleport the user avatar from the first location to the ephemeral location;
display a video or machinima in real time at the ephemeral location for the user avatar to observe and/or interact with;
teleport the user avatar out of the ephemeral location back to the first location, or to another location in the VU, after the video or machinima is completed; and
un-render the ephemeral location after the user avatar has been transported out of the ephemeral location so that the VU-ad does not occupy permanent real estate in the VU;
wherein the contacting the object comprises one of the user avatar touching, walking into, and flying into the object.

12. The computer program product of claim 11, wherein the altering the VU-ad comprises at least one of:
moving the ad object or the ad avatar to a different location;
altering a visual appearance of the ad object or the ad avatar;
altering a written or spoken language of the VU-ad;
deleting the ad object or the ad avatar;
allowing the user avatar to assume a role of an actor in the VU-ad; and
allowing the user avatar to step into a three-dimensional representation of a scene and view at least one of the ad object and the ad avatar from different points of view.

13. A method for dynamically altering advertising in a virtual universe (VU), comprising:
providing a computer infrastructure structured and arranged to:
present a virtual universe advertisement (VU-ad) at a first location in the VU, wherein the VU-ad comprises a three-dimensional representation of a scene in the VU, an ad avatar, and an ad object that are separate from a user avatar associated with a user of the VU, and wherein the user has access to the VU via a user computing device communicating with the computer infrastructure through a network;
permit the user of the VU to interact with the VU-ad during the presenting;
alter at least one characteristic of the VU-ad based upon the interaction;
based on the user avatar contacting the ad object:
render an ephemeral location that does not occupy permanent real estate in the VU;
teleport the user avatar from the first location to the ephemeral location;
display a video or machinima in real time at the ephemeral location for the user avatar to observe and/or interact with;
teleport the user avatar out of the ephemeral location back to the first location, or to another location in the VU, after the video or machinima is completed; and
un-render the ephemeral location after the user avatar has been transported out of the ephemeral location, wherein the ephemeral location is a temporary location in the VU rendered solely for the purpose of displaying the VU-ad;
wherein the contacting the object comprises one of the user avatar touching, walking into, and flying into the object.

14. The method of claim 13, wherein the interaction comprises at least one of the following:
a mouse command by the user;
a menu selection by the user;
a keystroke by the user;
a text communication by the user; and
a voice communication by the user.

15. The method of claim 13, wherein the computer infrastructure is further operable to provide an incentive to the user.

16. The method of claim 13, wherein a service provider at least one of creates, maintains, deploys and supports the computer infrastructure.

17. A system for dynamically altering a virtual universe (VU), comprising:
computer hardware and software structured and arranged to:
present a virtual universe advertisement (VU-ad) at a first location in the VU, wherein the VU-ad comprises an ad object and an ad avatar that are separate from a user avatar associated with a user;
during a first interaction of the user avatar with the VU-ad, receive input from the user associated with the user avatar of the VU to alter a feature of the VU-ad;
access stored changeable features of the ad object defining which features of the ad object are changeable;
alter the VU-ad in response to the input and the stored changeable features;
save the alteration made to the VU-ad in a customer database;

during a second interaction of the user avatar with the VU-ad, automatically present the VU-ad with the alterations made to the VU-ad based on the customer database;
based on the user avatar contacting the ad object:
render an ephemeral location that does not occupy permanent real estate in the VU, which ephemeral location is a temporary location in the VU;
teleport the user avatar from the first location to the ephemeral location;
displaying, on a graphical user interface (GUI), display a video or machinima in real time at the ephemeral location for the user avatar to observe and/or interact with;
teleport the user avatar out of the ephemeral location back to the first location, or to another location in the VU, after the video or machinima is completed; and
un-render the ephemeral location after the user avatar has been transported out of the ephemeral location so that the VU-ad does not occupy permanent real estate in the VU;
wherein the contacting the object comprises one of the user avatar touching, walking into, and flying into the object.

18. The system of claim 17, wherein:
the ad avatar originally communicates in a first language, and
based upon the input from the user, the altering comprises causing the ad avatar to communicate in a second language different from the first language.

19. The method of claim 1, wherein:
the video or machinima comprises a machinima depicting events happening in real time or that have already happened at another location in the VU.

20. The method of claim 1, further comprising:
receiving, by the computing device, a user selection of a chosen character in a movie;
wherein the displaying the video or machinima comprises playing at least a portion of the movie with the user's avatar assuming the role of the chosen character and performing the role of the chosen character according to a script of the movie.

21. The method of claim 1, wherein the receiving the input from the user comprises, during a first interaction of the user avatar with the VU-ad, receiving input from the user associated with the user avatar of the VU to alter a feature of the VU-ad, the method further comprising:
accessing, by the computing device, stored changeable features of the ad object defining which features of the ad object are changeable;
altering, by the computing device, the ad object of the VU-ad in response to the input and the stored changeable features;
saving, by the computing device, the alteration made to the VU-ad in a customer database; and
during a second interaction of the user avatar with the VU-ad, automatically presenting the VU-ad with the alterations made to the ad object based on the customer database.

\* \* \* \* \*